(12) United States Patent
Kiessling

(10) Patent No.: US 11,051,461 B2
(45) Date of Patent: Jul. 6, 2021

(54) STACKABLE PLANTER ASSEMBLY

(71) Applicant: Erik Kiessling, Glen Burnie, MD (US)

(72) Inventor: Erik Kiessling, Glen Burnie, MD (US)

(*) Notice: Subject to any disclaimer, the term of this patent is extended or adjusted under 35 U.S.C. 154(b) by 228 days.

(21) Appl. No.: 16/374,321

(22) Filed: Apr. 3, 2019

(65) Prior Publication Data

US 2020/0315100 A1 Oct. 8, 2020

(51) Int. Cl.
*A01G 9/02* (2018.01)

(52) U.S. Cl.
CPC .................... *A01G 9/023* (2013.01)

(58) Field of Classification Search
CPC ........ A01G 9/023; A01G 9/0295; A01G 9/02; A01G 9/022; A01G 9/00
See application file for complete search history.

(56) References Cited

U.S. PATENT DOCUMENTS

| | | | | |
|---|---|---|---|---|
| 3,686,791 | A * | 8/1972 | Mills | E04C 1/395 47/83 |
| 4,419,843 | A | 12/1983 | Johnson, Sr. | |
| 5,533,302 | A | 7/1996 | Lynch | |
| 6,612,073 | B1 * | 9/2003 | Powell | A01G 9/023 47/65.5 |
| D493,384 | S | 7/2004 | Jensen | |
| 6,840,008 | B1 | 1/2005 | Bullock | |
| 6,993,869 | B2 * | 2/2006 | Waters | A01G 9/022 47/65.5 |
| 8,250,804 | B2 | 8/2012 | Chang | |
| D741,216 | S | 10/2015 | Peterson | |
| 9,521,811 | B2 * | 12/2016 | Peterson | A01G 27/005 |
| 2007/0101646 | A1 * | 5/2007 | Licht | A01G 9/02 47/86 |
| 2009/0119987 | A1 * | 5/2009 | Ingrassia | A01G 9/0295 47/66.5 |
| 2010/0229464 | A1 * | 9/2010 | Wilkes | A01G 9/023 47/82 |

FOREIGN PATENT DOCUMENTS

FR 2881918 A1 * 8/2006 ............. A01G 9/023

* cited by examiner

*Primary Examiner* — Kristen C Hayes

(57) ABSTRACT

A stackable planter assembly includes a plurality of planting boxes that each has a plurality of planting portions for have plants being planted therein. Each of the planting boxes has a drain that is centrally positioned between each of the planting portions for has water pass therethrough. The planting boxes are stackable on top of each other and having the planting portions on each of the planting boxes being offset with the planting portions on an adjacent one of the planting boxes. A plurality of receivers is each coupled to and extends outwardly from a respective one of the planting boxes. Each of the receivers is aligned with a respective one of the receivers when the planting boxes are stacked on top of each other. A plurality of poles is each extendable through respective ones of the receivers for retaining the plurality of planting boxes on top of each other.

6 Claims, 4 Drawing Sheets

STACKABLE PLANTER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to planter devices and more particularly pertains to a new planter device for growing plants in a vertical stack.

(2) Description of Related Art Including Information Disclosed Under 37 CFR 1.97 and 1.98

The prior art relates to planter devices.

BRIEF SUMMARY OF THE INVENTION

An embodiment of the disclosure meets the needs presented above by generally comprising a plurality of planting boxes that each has a plurality of planting portions for have plants being planted therein. Each of the planting boxes has a drain that is centrally positioned between each of the planting portions for has water pass therethrough. The planting boxes are stackable on top of each other and having the planting portions on each of the planting boxes being offset with the planting portions on an adjacent one of the planting boxes. A plurality of receivers is each coupled to and extends outwardly from a respective one of the planting boxes. Each of the receivers is aligned with a respective one of the receivers when the planting boxes are stacked on top of each other. A plurality of poles is each extendable through respective ones of the receivers for retaining the plurality of planting boxes on top of each other.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
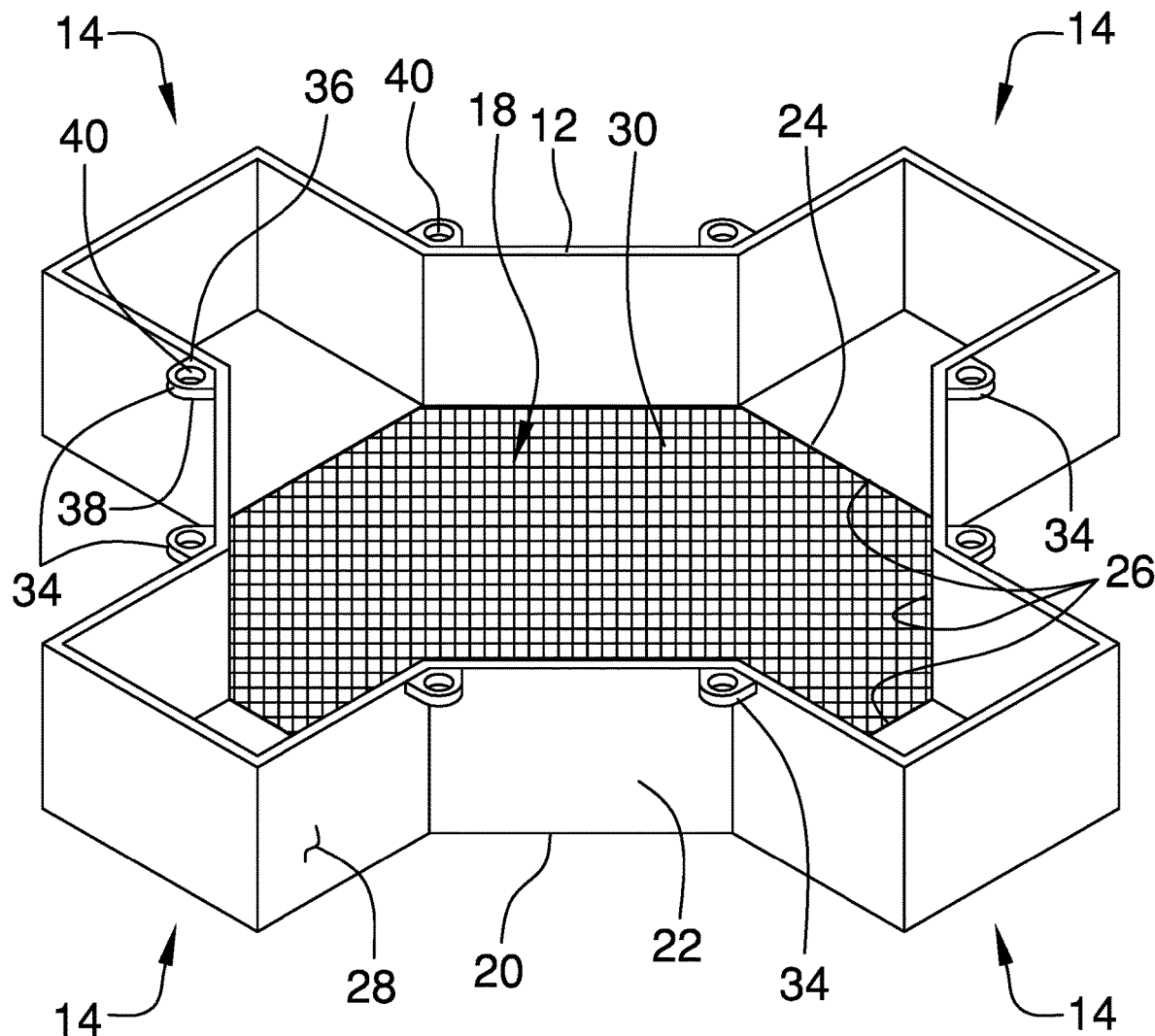
FIG. 1 is a top perspective view of a planting box of a stackable planter assembly according to an embodiment of the disclosure.
Figure 2:
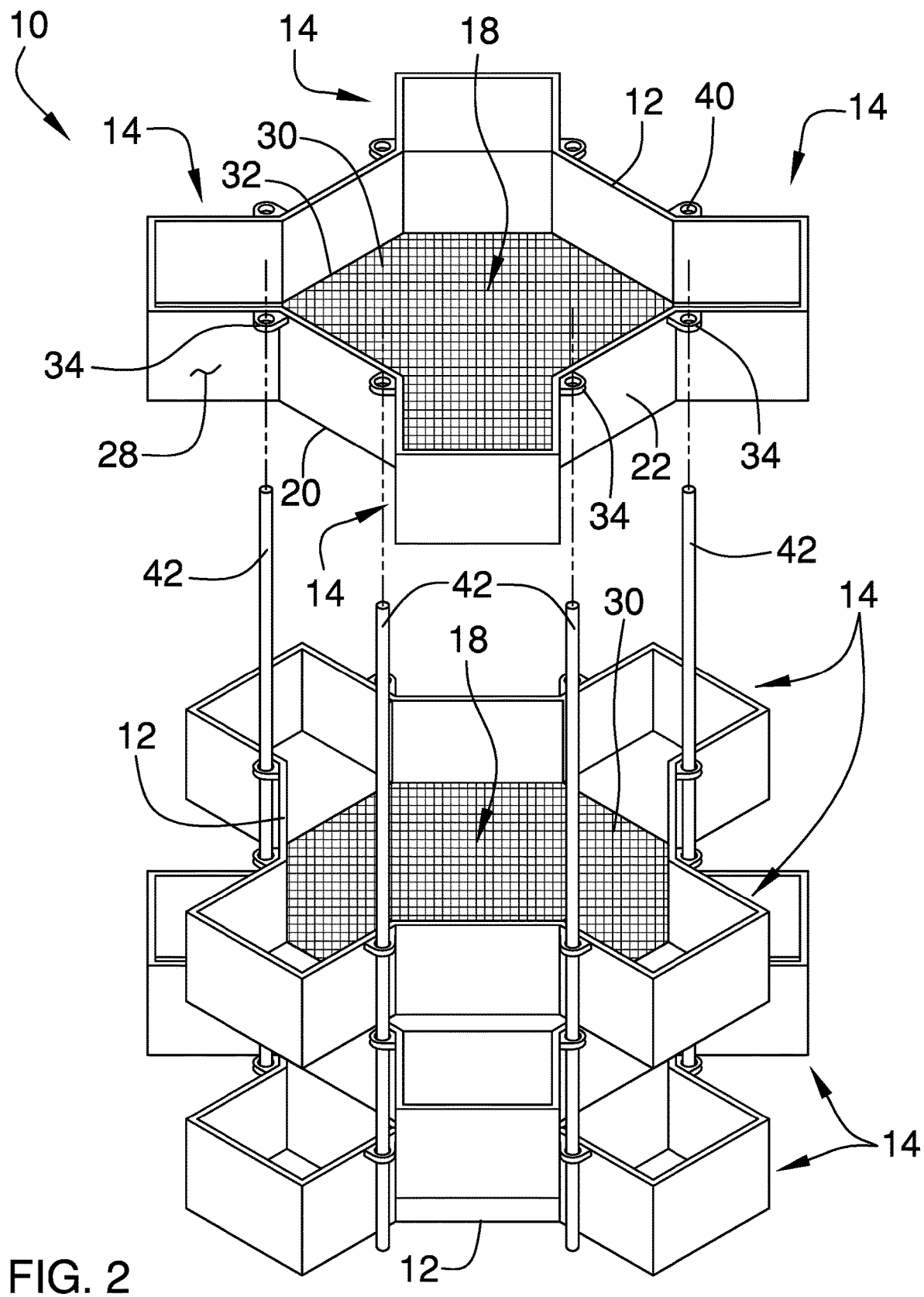
FIG. 2 is an exploded perspective view of an embodiment of the disclosure.
Figure 3:
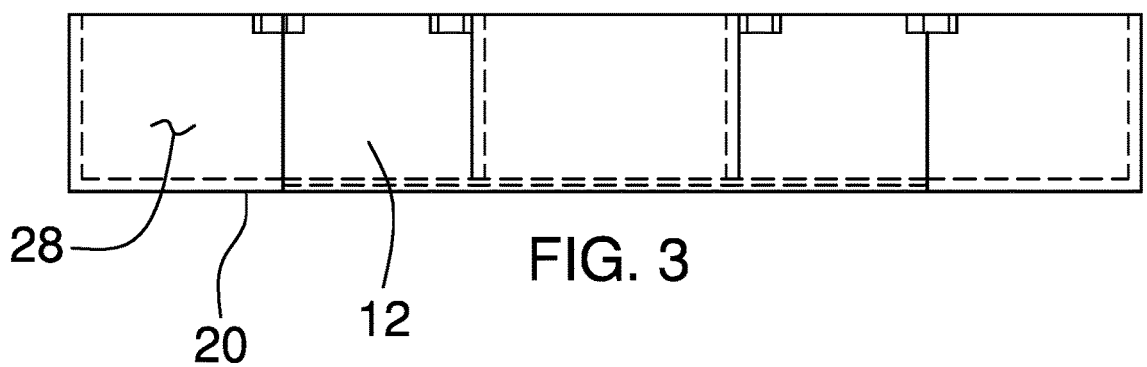
FIG. 3 is a front phantom view of a planting box of an embodiment of the disclosure.
Figure 4:
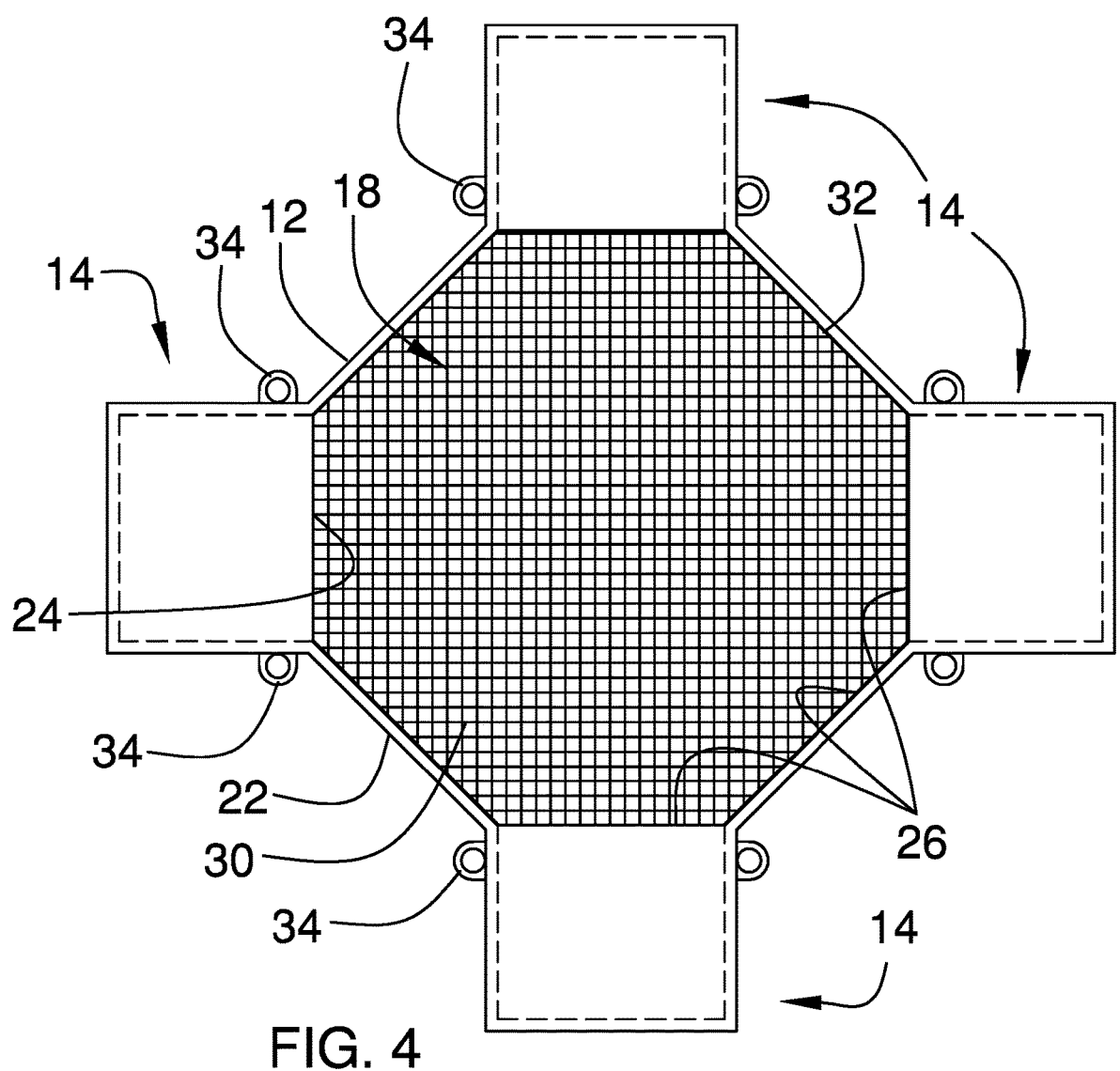
FIG. 4 is a bottom phantom view of a planting box of an embodiment of the disclosure.
Figure 5:
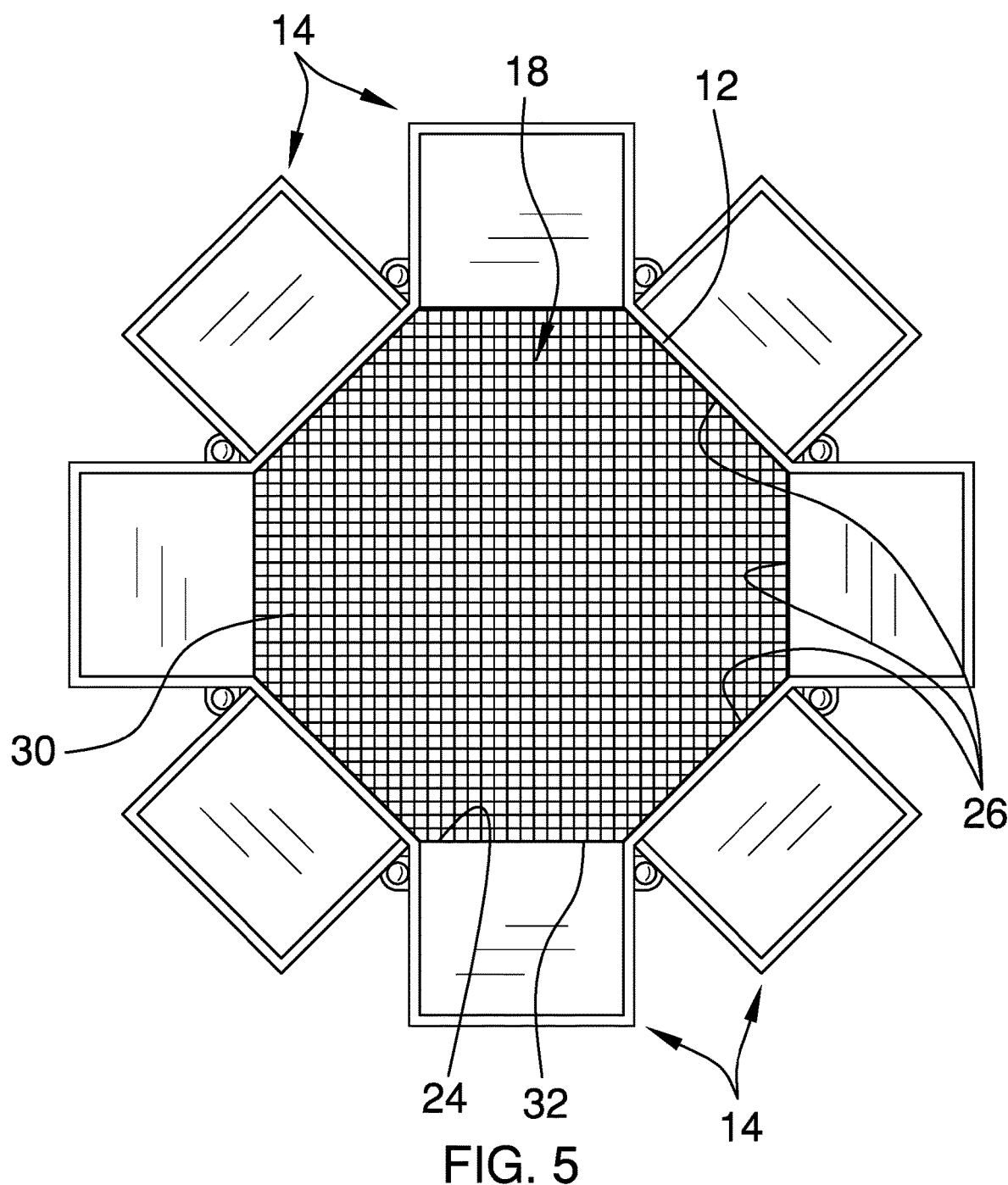
FIG. 5 is a top view of an embodiment of the disclosure.

With reference now to the drawings, and in particular to FIGS. 1 through 5 thereof, a new planter device embodying the principles and concepts of an embodiment of the disclosure and generally designated by the reference numeral 10 will be described.

As best illustrated in FIGS. 1 through 5, the stackable planter assembly 10 generally comprises a plurality of planting boxes 12. Each of the planting boxes 12 can be filled with soil or other growing media for growing plants. Each of the planting boxes 12 has a plurality of planting portions 14 and each of the planting portions 14 in each planting box 12 can have plants being planted therein. Moreover, each of the planting boxes 12 has a drain 18 that is centrally positioned between each of the planting portions 14 for passing water therethrough. Each of the planting portions 14 on a respective one of the planting boxes 12 is spaced apart from each other and is distributed around the drain 18 of the respective planting box 12. The planting boxes 12 are stackable on top of each other having each of the planting boxes 12 being rotated about a vertical axis with respect to each other. In this way the planting portions 14 on each of the planting boxes 12 is offset with the planting portions 14 on an adjacent one of the planting boxes 12 to facilitate the plants in each of planting portions 14 of each of the planting boxes 12 to be vertically unimpeded for growing.

Each of the planting boxes 12 has a bottom wall 20 and a peripheral wall 22 extending upwardly therefrom. The drain 18 on a each of the planting boxes 12 extends through the bottom wall 20 of the planting box and the drain 18 on each of the planting boxes 12 has a bounding edge 24. The bounding edge 24 of the drain 18 has a plurality of intersecting sides 26 each being oriented at an angle with each other. Thus, the drain 18 on each of planting boxes 12 has an octagonal shape. The peripheral wall 22 of each of planting boxes 12 has an outer surface 28, and the bottom wall 20 of each of the planting boxes rests on the peripheral wall 22 of an adjacent planting box 12 when the planting boxes 12 are stacked.

Each of the planting portions 14 of a respective planting box 12 is oriented to extend outwardly from every other one of the intersecting sides 26 of the bounding edge 24 of the drain 18 of the respective planting box 12. Thus, each of the planting portions 14 on the respective planting box 12 forms respective arms of an X-shape. The drain 18 in each of the planting boxes 12 is aligned with the drain 18 in an adjacent one of the planting boxes 12 when the planting boxes 12 are stacked upon each other. In this way the water can pass downwardly through the stack of the planting boxes 12 for watering the plants in the planting portions 14 of each of the planting boxes 12.

A plurality of screens 30 is each positioned in a respective one of the planting boxes 12. Each of the screens 30 is positioned over the drain 18 in the respective planting box 12 to retain soil in the respective planting box 12 while passing water therethrough. Each of the screens 30 has an outer edge 32, and the outer edge 32 of each of the screens 30 is coupled to the bounding edge 24 of the drain 18 in the respective planting box 12. Each of the screens 30 may be comprised of a mesh material or any other fluid permeable material that is capable of inhibiting soil from passing therethrough.

A plurality of receivers 34 is each coupled to and extends outwardly from a respective one of the planting boxes 12. Each of the receivers 34 is aligned with an intersection between a respective one of the planting portions 14 and the respective planting box 12. Each of the receivers 34 on each of the planting boxes 12 is aligned with a respective one of the receivers 34 on an adjacent one of the planting boxes 12 when the planting boxes 12 are stacked on top of each other. Additionally, each of the receivers 34 is positioned on the outer surface 28 of the perimeter wall of the respective planting box 12.

Each of the receivers 34 has a top side 36 and a bottom side 38, and each of the receivers 34 has a pole aperture 40 extending through the top 36 and bottom 38 sides. The receivers 34 on the respective planting box 12 are spaced apart from each other and are distributed around the respective planting box 12. A plurality of poles 42 is provided and each of the poles 42 is extendable through respective ones of the receivers 34 that are aligned with each other when the planting boxes 12 are stacked upon each other. In this way the poles 42 retain the plurality of boxes 12 on top of each other. Each of the poles 42 extends through the pole aperture 40 in each of the respective receivers 34.

In use, a respective planting box 12 is filled with soil prior to stacking another planting box 12 on top of the respective planting box 12. Additionally, each planting box 12 is rotated approximately 45.0 degrees about a vertical axis when the planting boxes 12 are stacked upon each other. In this way the planting portions 14 of each of the planting boxes 12 are offset with respect to the planting portions 14 of an adjacent one of the planting boxes 12. Thus, the plants that are planted in each planting portion 14 is vertically unimpeded for growing. Water is poured into a top most one of the stacked planting boxes 12 for watering the plants in each of the planting boxes 12. The water drains downwardly through the drain 18 in each of planting boxes 12 for watering the plants. The poles 42 are each extended downwardly through the respective receives when the planting boxes 12 are stacked for inhibiting the planting boxes 12 from sliding off of each other.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A stackable planter assembly having a plurality of modular sections wherein said assembly is configured to have a variety of plants grown in a vertical tower, said assembly comprising:
   a plurality of planting boxes, each of said planting boxes having a plurality of planting portions wherein each of said planting portions is configured to have plants being planted therein, each of said planting boxes having a drain being centrally positioned between each of said planting portions for having water pass therethrough, each of said planting portions on a respective one of said planting boxes being spaced apart from each other and being distributed around said drain of said respective planting box, said planting boxes being stackable on top of each other having each of said planting boxes being rotated about a vertical axis with respect to each other such that said planting portions on each of said planting boxes is offset with said planting portions on an adjacent one of said planting boxes wherein said plurality of planting boxes is configured to facilitate the plants in each of planting portions of each of said planting boxes to be vertically unimpeded for growing;
   a plurality of receivers, each of said receivers being coupled to and extending outwardly from a respective one of said planting boxes, each of said receivers being aligned with an intersection between a respective one of said planting portions and said respective planting box, each of said receivers on each of said planting boxes being aligned with a respective one of said receivers on an adjacent on of said planting boxes when said planting boxes are stacked on top of each other;
   a plurality of poles, each of said poles being extendable through respective ones of said receivers being aligned with each other when said planting boxes are stacked upon each other thereby retaining said plurality of planting boxes on top of each other;
   wherein each of said planting boxes has a bottom wall and a peripheral wall extending upwardly therefrom, said drain on a each of said planting boxes extending through said bottom wall of said planting box, said drain on each of said planting boxes having a bounding edge, said bounding edge of said drain having a plurality of intersecting sides each being oriented at an angle with each other such that said drain on each of planting boxes has an octagonal shape, said perimeter wall of each of planting boxes having an outer surface; and wherein each of said planting portions of a respective planting box is oriented to extend outwardly from every other one of said intersecting sides of said bounding edge of said drain of said respective planting box such that each of said planting portions on said respective planting box forms respective arms of an X-shape.

2. The assembly according to claim 1, wherein said drain in each of said planting boxes is aligned with said drain in an adjacent one of said planting boxes when said planting boxes are stacked upon each other wherein said drain in each of said planting boxes is configured to pass the water downwardly through the stack of said planting boxes.

3. The assembly according to claim 2, further comprising a plurality of screens, each of said screens being positioned in a respective one of said planting boxes, each of said screens being positioned over said drain in said respective planting box wherein each of said screens is configured to retain soil in said respective planting box while passing water therethrough, each of said screens having an outer edge, said outer edge of each of said screens being coupled to said bounding edge of said drain in said respective planting box.

4. A stackable planter assembly having a plurality of modular sections wherein said assembly is configured to have a variety of plants grown in a vertical tower, said assembly comprising:
a plurality of planting boxes, each of said planting boxes having a plurality of planting portions wherein each of said planting portions is configured to have plants being planted therein, each of said planting boxes having a drain being centrally positioned between each of said planting portions for having water pass therethrough, each of said planting portions on a respective one of said planting boxes being spaced apart from each other and being distributed around said drain of said respective planting box, said planting boxes being stackable on top of each other having each of said planting boxes being rotated about a vertical axis with respect to each other such that said planting portions on each of said planting boxes is offset with said planting portions on an adjacent one of said planting boxes wherein said plurality of planting boxes is configured to facilitate the plants in each of planting portions of each of said planting boxes to be vertically unimpeded for growing;
a plurality of receivers, each of said receivers being coupled to and extending outwardly from a respective one of said planting boxes, each of said receivers being aligned with an intersection between a respective one of said planting portions and said respective planting box, each of said receivers on each of said planting boxes being aligned with a respective one of said receivers on an adjacent on of said planting boxes when said planting boxes are stacked on top of each other;
a plurality of poles, each of said poles being extendable through respective ones of said receivers being aligned with each other when said planting boxes are stacked upon each other thereby retaining said plurality of planting boxes on top of each other;
wherein each of said planting boxes has a bottom wall and a peripheral wall extending upwardly therefrom, said drain on a each of said planting boxes extending through said bottom wall of said planting box, said drain on each of said planting boxes having a bounding edge, said bounding edge of said drain having a plurality of intersecting sides each being oriented at an angle with each other such that said drain on each of planting boxes has an octagonal shape, said perimeter wall of each of planting boxes having an outer surface; and wherein each of said receivers is positioned on said outer surface of said perimeter wall of said respective planting box, each of said receivers having a top side and a bottom side, each of said receivers having a pole aperture extending through said top and bottom sides, said receivers on said respective planting box being spaced apart from each other and being distributed around said respective planting box.

5. The assembly according to claim 4, wherein each of said poles extends through said pole aperture in each of said respective receivers.

6. A stackable planter assembly having a plurality of modular sections wherein said assembly is configured to have a variety of plants grown in a vertical tower, said assembly comprising:
a plurality of planting boxes, each of said planting boxes having a plurality of planting portions wherein each of said planting portions is configured to have plants being planted therein, each of said planting boxes having a drain being centrally positioned between each of said planting portions for having water pass therethrough, each of said planting portions on a respective one of said planting boxes being spaced apart from each other and being distributed around said drain of said respective planting box, said planting boxes being stackable on top of each other having each of said planting boxes being rotated about a vertical axis with respect to each other such that said planting portions on each of said planting boxes is offset with said planting portions on an adjacent one of said planting boxes wherein said plurality of planting boxes is configured to facilitate the plants in each of planting portions of each of said planting boxes to be vertically unimpeded for growing, each of said planting boxes having a bottom wall and a peripheral wall extending upwardly therefrom, said drain on a each of said planting boxes extending through said bottom wall of said planting box, said drain on each of said planting boxes having a bounding edge, said bounding edge of said drain having a plurality of intersecting sides each being oriented at an angle with each other such that said drain on each of planting boxes has an octagonal shape, each of said planting portions of a respective planting box being oriented to extend outwardly from every other one of said intersecting sides of said bounding edge of said drain of said respective planting box such that each of said planting portions on said respective planting box forms respective arms of an X-shape, said drain in each of said planting boxes being aligned with said drain in an adjacent one of said planting boxes when said planting boxes are stacked upon each other wherein said drain in each of said planting boxes is configured to pass the water downwardly through the stack of said planting boxes, said perimeter wall of each of planting boxes having an outer surface;
a plurality of screens, each of said screens being positioned in a respective one of said planting boxes, each of said screens being positioned over said drain in said respective planting box wherein each of said screens is configured to retain soil in said respective planting box while passing water therethrough, each of said screens having an outer edge, said outer edge of each of said screens being coupled to said bounding edge of said drain in said respective planting box;

a plurality of receivers, each of said receivers being coupled to and extending outwardly from a respective one of said planting boxes, each of said receivers being aligned with an intersection between a respective one of said planting portions and said respective planting box, each of said receivers on each of said planting boxes being aligned with a respective one of said receivers on an adjacent on of said planting boxes when said planting boxes are stacked on top of each other, each of said receivers being positioned on said outer surface of said perimeter wall of said respective planting box, each of said receivers having a top side and a bottom side, each of said receivers having a pole aperture extending through said top and bottom sides, said receivers on said respective planting box being spaced apart from each other and being distributed around said respective planting box; and a plurality of poles, each of said poles being extendable through respective ones of said receivers being aligned with each other when said planting boxes are stacked upon each other thereby retaining said plurality of plating boxes on top of each other, each of said poles extending through said pole aperture in each of said respective receivers.

\* \* \* \* \*